April 28, 1970  J. STEENHOUDT  3,508,741
FENCE POST AND METHOD OF TIGHTENING A FENCE
Filed Sept. 4, 1968  2 Sheets-Sheet 1

INVENTOR
JAN STEENHOUDT
BY
SPARROW AND SPARROW
ATTORNEYS

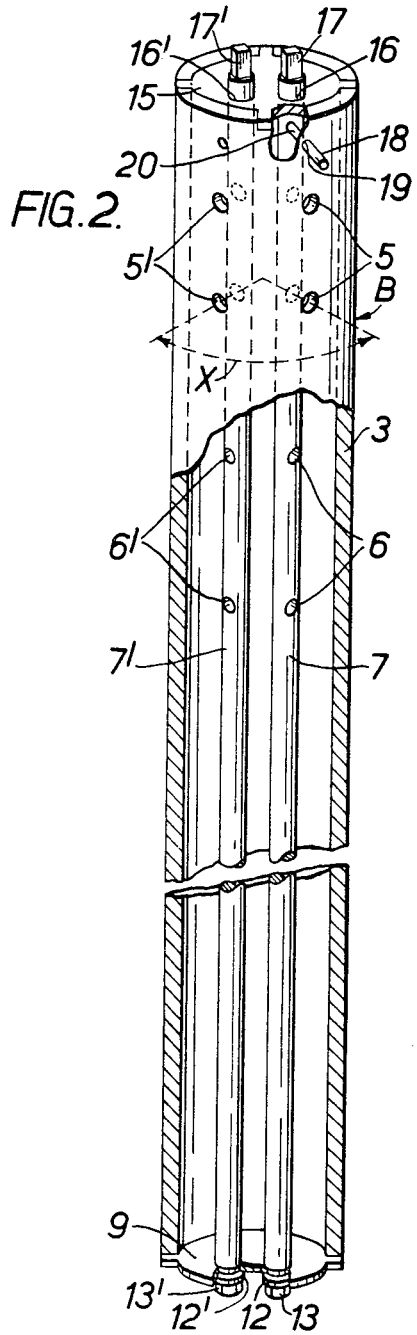
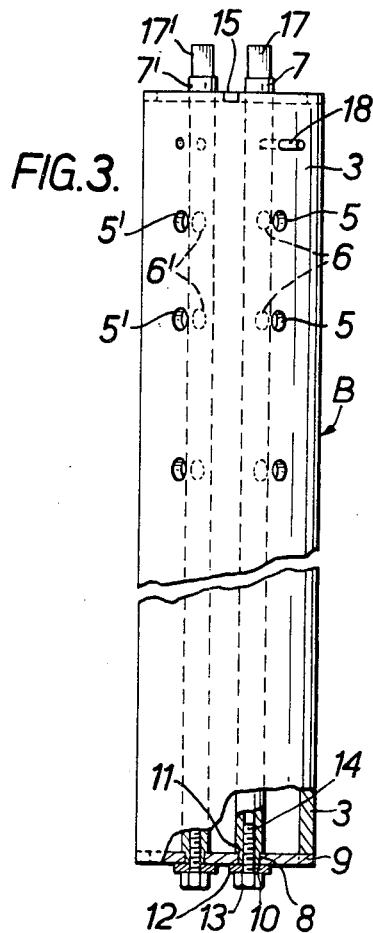
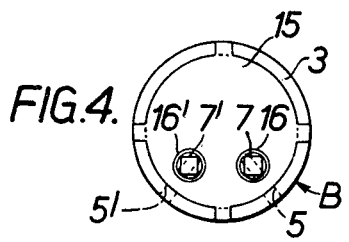

United States Patent Office 3,508,741
Patented Apr. 28, 1970

---

3,508,741
FENCE POST AND METHOD OF TIGHTENING
A FENCE
Jan Steenhoudt, Kortrijk, Belgium, assignor to Trefileries
Leon Bekaert, PVBA, Zwevegem, Belgium
Filed Sept. 4, 1968, Ser. No. 757,379
Claims priority, application France, Sept. 7, 1967,
120,231
Int. Cl. E40h 17/02
U.S. Cl. 256—40   4 Claims

ABSTRACT OF THE DISCLOSURE

A tubular fence post with at least one line of holes for inserting wires attached to a fence. At least one rotatable rod in the post, which has a line of holes corresponding to one line of holes in the tubular post for inserting the wires therethrough. Means for rotating the rod thereby winding the wires thereon and thus tightening the fence; means for securing the rod in the tightened position. The method of erecting and tightening a fence.

BACKGROUND OF THE INVENTION

The invention relates to fence posts and to fence tightening means in said fence post and to the method of tightening a fence. Fence posts for attaching a fence, particularly a wire or wire mesh fence are known, and various devices for tensioning the wire mesh are known, but these devices have known inconveniences; for example the tension applied to the fence is not always evenly distributed over the width of the fence web; the tension which has been reached, is partly relaxed when the tightening devices are fixedly secured; additional tools such as collars, screws and the like parts have to be used. The known methods of setting up a wire or a wire mesh fence are more or less quite primitive and do not give satisfactory results. Problems of this nature are intended to be solved by this invention.

SUMMARY

The invention consists in such novel features, construction arrangements, combinations of parts and improvements as may be shown and described in connection with the device herein disclosed by way of example only and as illustrative of a preferred embodiment. The basic concept of the invention is to present a novel device for obtaining a straight and relatively rigid fence between two consecutive fence posts. At the same time the invention is directed to a simplified method of tensioning the wires and wire meshes of a fence and of securing the same in the tensioned state.

The invention appertains to device for tensioning a fence having elongated wires and for locking these wires under tension. The device has a tubular post provided with at least one row of radiallly disposed holes for receiving the adjacent ends of the wires and a rotatably mounted shaft for tensioning the wires extending within the post. The shaft has radially disposed holes spaced corresponding to the row of holes in the post. Means are provided on the shaft for rotating the same and operable means are provided for locking the shaft in the post against rotation. The tubular post may have a plurality of rows of radially disposed holes and may be provided with a plurality of shafts corresponding to a plurality of sections of the fence to be tensioned with the plurality of rows arranged at substantially the same angles corresponding to the angles of sections of the fence.

Objects and advantages of the invention will be set forth in part hereafter and in part will be obvious herefrom or may be learned by practicing the invention, the same being realized and attained by means of the instrumentalities and combinations pointed out in the appended claims.

It is an object of the present invention to provide a new tubular fence post with at least one axially extending line of radially drilled holes in the wall of the post for inserting the wires of a wire or wire mesh fence.

It is a further object of the invention to provide at least one rotatable shaft extending axially in the tubular post, having radially drilled holes corresponding to those in the wall of the post, for receiving the wires which have been inserted through the wall.

It is another object of the invention to provide means for rotating the axially extending shafts for tensioning the wires attached thereto.

Furthermore, it is an object of the invention to provide means for securing the axially extending shafts in the final position after the wires or wire meshes of the fence have been properly tensioned.

Yet another object of the invention is to provide a new method of tensioning the wires or wire meshes of the fence.

Various further and more specific purposes, features and advantages will clearly appear from the detailed decription given below taken in connection with the accompanying drawing which forms part of this specification and illustrates merely by way of example one embodiment of the device of the invention.

BRIEF DESCRIPTION OF THE DRAWING

In the following description and in the claims, parts will be identified by specific names for convenience, but such names are intended to be as generic in their application to similar parts as the art will permit. Like reference characters denote like parts in the several figures of the drawing, in which:

FIG. 2 is a longitudinal view of an axial section of the tubular fence post, partly broken away;

FIG. 3 is a side view of the fence post, partly broken away; and

FIG. 4 is a plan view of the fence post.

DESCRIPTION OF THE PREFERRED EMBODIMENT

Figure 1:
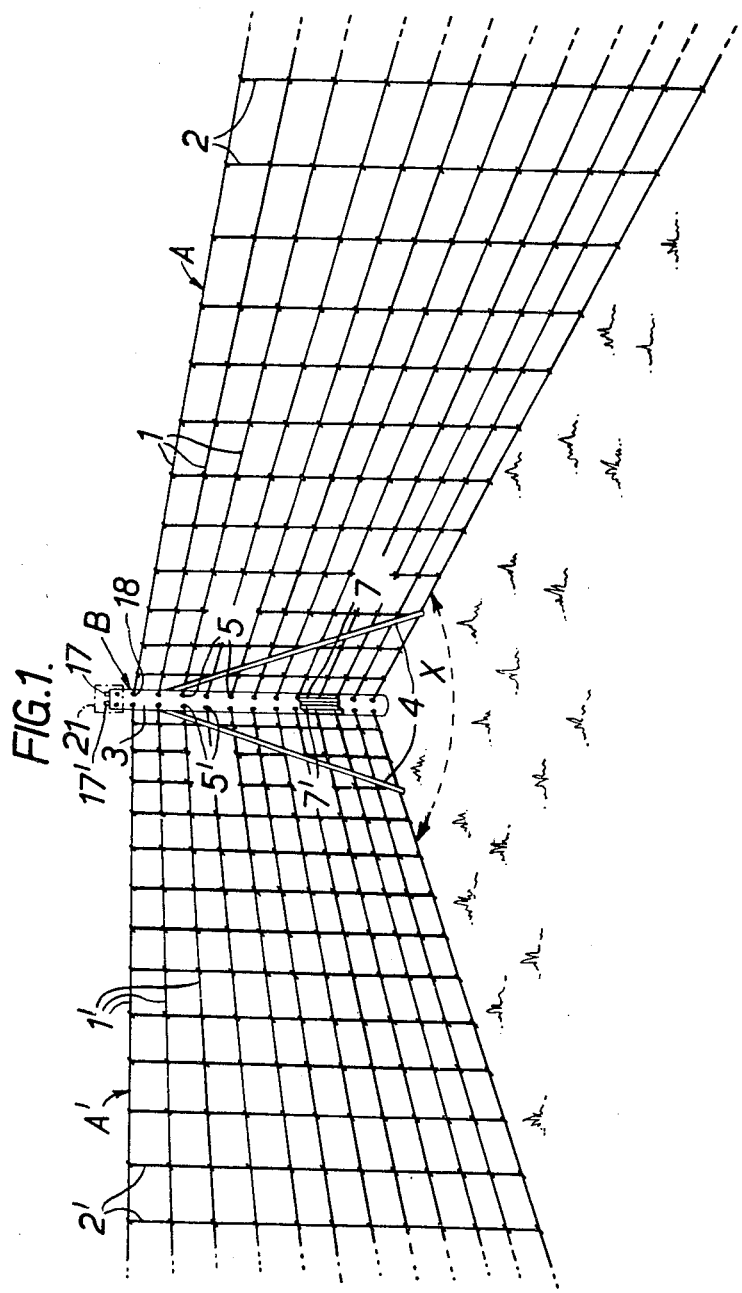
FIG. 1 shows a portion of a wire mesh fence with two fence webs attached to and tensioned by a tubular fence post.

Referring now in more detail to the drawing illustrating a preferred embodiment by which the invention may be realized, there is shown in FIG. 1 a corner of a fence having two sections or panels A and A' which are tensioned according to the invention. The sections or panels form part of an enclosure fence which consists of horizontal wires 1 and 1' which are connected by vertical wires 2 and 2'. Tensioning of the sections or panels is performed by the corner device B which consists substantially of a tubular post 3. Post 3 is set into the ground and is supported against the pull of the fence by force legs 4.

Post 3 has two vertical lines or rows of holes 5 and 5' corresponding to wires 1 and 1' of the panels A and A' of the fence. Holes 5 and 5' are arranged in pairs in the same horizontal plane on post 3. They are drilled in post 3 in such manner that panels A and A' with wires 1 and 1' inserted into holes 5 and 5' form between them an angle X which is the same angle of the plot or area to be enclosed. Two tensioning members or shafts 7 and 7' having holes 6 and 6' are axially arranged in post 3 and wires 1, 1' are inserted in holes 6, 6' after they have been inserted through holes 5, 5'. Holes 6, 6' are spaced along shafts 7, 7' in the same increments as holes 5, 5' in post 3. Shafts 7, 7' have shoulders 8 (FIG. 3) at their lower end abutting against a lower member or plate 9 closing tubular post 3.

The turned down or reduced ends 10 or shafts 7, 7' are rotatably arranged in bores 11 in plate 9. Shafts 7, 7' are axially held in place in plate 9 by washers 12 which are fastened at the ends of shafts 7, 7' by screws or similar elements 13 tightened in threaded holes 14 in shafts 7, 7'.

The upper end of post 3 has a further plate 15 which has also two bores 16, 16' in which the upper parts of shafts 7, 7' are rotatably located. The ends of shafts 7, 7' extend through bores 16, 16' and preferably have polygonal shapes 17, 17' which permit the application of a standard wrench for rotating shafts 7, 7'.

By rotating shafts 7, 7', wires 1, 1' are wound thereon, thereby tensioning the fence. After the fence has been tightened a pin or like member 18 extended through respective holes 19, 20 of post 3 and shaft 7 provides locking thereof thus keeping the wires of fence portion A under tension. A similar pin (not visible in the drawing) maintains wires 1' of fence portion B under tension by locking post 3 and shaft 7'.

In order to protect the upper part of post 3 from corrosive action due to atmospheric conditions and rain, a cover or similar closure 21 (FIG. 1) may be used, in the shape of a cap, made preferably of non-metallic material. Cover 21 fits tightly over the wall of tubular post 3.

While the invention has been described and illustrated with respect to a certain preferred example which gives satisfactory results, it will be understood by those skilled in the art after understanding the principle of the invention, that various changes and modifications may be made without departing from the spirit and scope of the invention.

What is claimed is:

1. A device for tensioning a fence having wires and for locking said fence under tension, said device comprising in combination a substantially hollow tubular post with at least one row of radially disposed holes along the longitudinal axis of said post for inserting said wires; at least one shaft within said post and having radially disposed holes spaced corresponding to said row of holes in said post, said shaft having a shouldered end with end portion narrowed to a diameter substantially smaller than the diameter of said shaft along the portion of said shaft having said holes; an end plate with opening in which said end portion is rotatable, said shouldered end bearing against said plate on the plate surface within said post; fastening means with washer means on the exterior surface of said end plate for securing said shaft against said end plate so that said shaft is restrained from moving longitudinally while being free to rotate within said opening through said shouldered end portion; an end portion on said shaft protruding from said post and having flat surfaces for rotating said shaft relative to said post with a standard tool, said wires being tensioned after insertion through said holes in said post and said shaft and rotating said shaft with said tool; and removable locking pin means insertable through openings in said post and said shaft for maintaining said shaft in fixed position relative to said post after tensioning said wires through rotation of said shaft by said tool.

2. A device for tensioning a fence according to claim 1, said tubular post having a plurality of said rows of said radially-disposed holes and having a plurality of said shafts in said tubular post corresponding to a plurality of sections of said fence to be tensioned.

3. A device for tensioning a fence according to claim 2, said plurality of said rows of holes being arranged at substantially the same angles corresponding to the angles between said sections of said fence.

4. A device for tensioning a fence according to claim 1, said shaft having a substantially polygonally shaped head to be engaged by said standard tool for tensioning said wires.

References Cited

UNITED STATES PATENTS

| 172,460 | 1/1876 | Lightfoot | 256—41 |
| 924,630 | 6/1909 | Buckman et al. | 256—41 |
| 1,177,327 | 3/1916 | Hindmarsh | 256—41 |
| 1,475,884 | 11/1923 | Romback | 256—42 |
| 1,604,002 | 10/1926 | Ward | 256—41 |
| 2,571,347 | 10/1951 | Dodd | 256—41 |
| 3,173,662 | 3/1965 | Millerbernd | 256—52 |

FOREIGN PATENTS 3,858  10/1932  Australia.

DENNIS L. TAYLOR, Primary Examiner